United States Patent [19]

Tejeda

[11] Patent Number: 4,671,863
[45] Date of Patent: Jun. 9, 1987

[54] REVERSIBLE ELECTROLYTIC SYSTEM FOR SOFTENING AND DEALKALIZING WATER

[76] Inventor: Alvaro R. Tejeda, 407 Park Ave. South, Apt. 14F, New York, N.Y. 10016

[21] Appl. No.: 792,203

[22] Filed: Oct. 28, 1985

[51] Int. Cl.$^4$ .................. B01D 13/02; C23B 13/00
[52] U.S. Cl. .................. 204/266; 204/87; 204/101; 204/301; 204/151
[58] Field of Search .................. 204/263–266, 204/301, 275–278

[56] References Cited

U.S. PATENT DOCUMENTS

| | | | |
|---|---|---|---|
| 2,805,191 | 9/1957 | Hersch | 204/402 |
| 2,863,813 | 12/1958 | Juda et al. | 204/301 |
| 2,864,750 | 12/1958 | Hughes et al. | 204/149 |
| 2,898,282 | 8/1959 | Flook et al. | 204/432 |
| 3,135,674 | 6/1964 | Ruetschi | 204/301 |
| 3,322,574 | 5/1967 | Justi et al. | 204/301 |
| 3,453,201 | 7/1969 | Mihara et al. | 204/301 |
| 3,715,287 | 2/1973 | Johnson | 204/301 |
| 4,514,270 | 4/1985 | Furutani et al. | 204/301 |

*Primary Examiner*—T. Tung
*Attorney, Agent, or Firm*—Kirschstein, Kirschstein, Ottinger & Israel

[57] ABSTRACT

System for softening and dealkalizing water by feeding said water to both chambers of an electrolytic cell which chambers are separated by a cation exchange membrane, applying DC voltage to the electrodes of the cell, at intervals, reversing the applied polarities, and drawing soft dealkalized water from the anodic compartments.

7 Claims, 5 Drawing Figures

| SWITCH POSITION | FUNCTION | ELECTRODES | | LIGHTS | | OUTLETS | |
|---|---|---|---|---|---|---|---|
| | | RIGHT | LEFT | A | B | PIPE A | PIPE B |
| 1 | OFF | OFF | OFF | OFF | OFF | — | — |
| 2 | − + | + | − | ON | OFF | PRODUCT | WASTE |
| 3 | OFF | OFF | OFF | OFF | OFF | — | — |
| 4 | + − | − | + | OFF | ON | WASTE | PRODUCT |

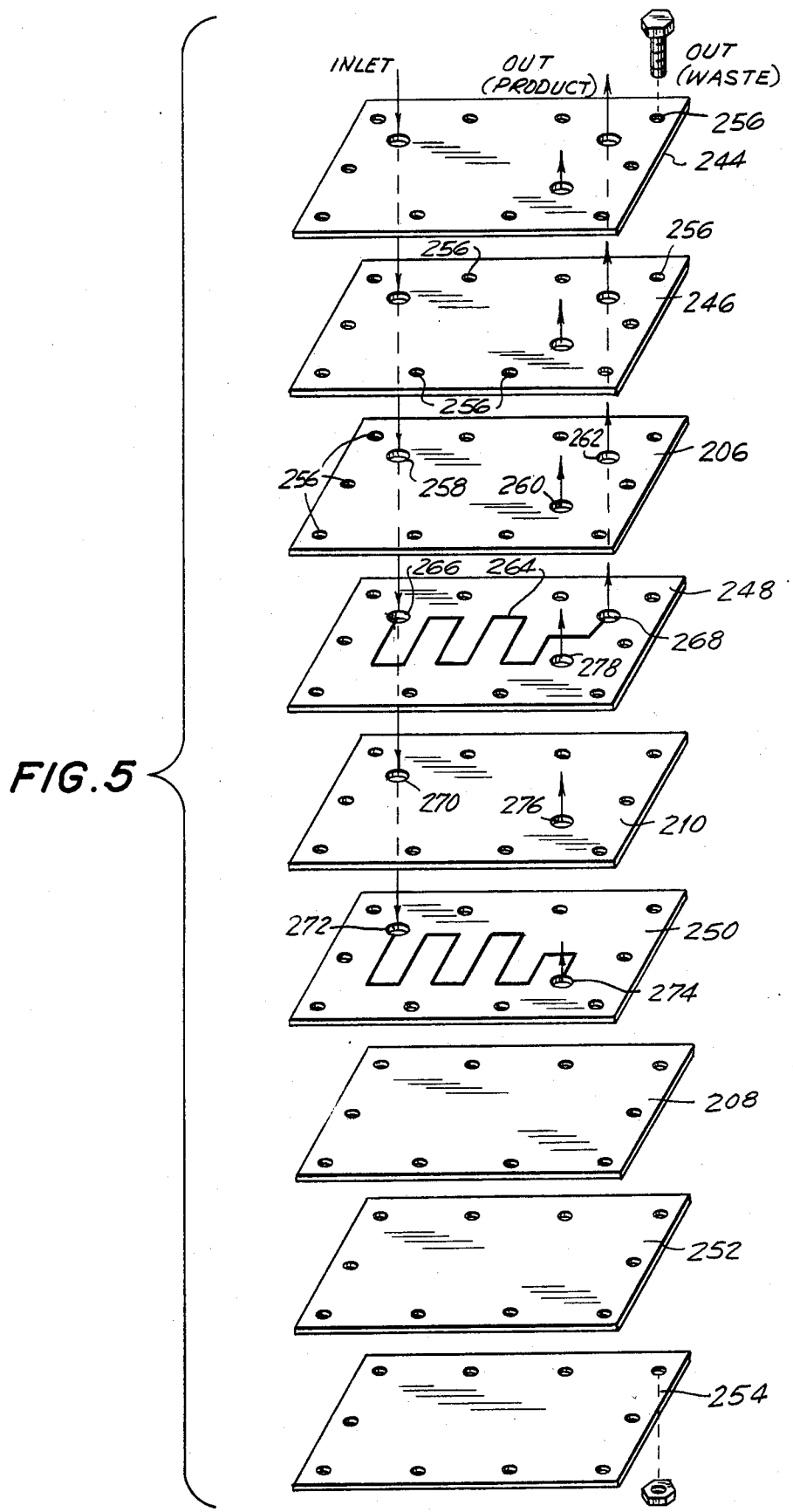

REVERSIBLE ELECTROLYTIC SYSTEM FOR SOFTENING AND DEALKALIZING WATER

BACKGROUND OF THE INVENTION

1. Field of the Invention

A method and apparatus for softening and dealkalizing water in a reverisble electrolytic cell for domestic, industrial and other applications.

2. Description of the Prior Art

The presence of calcium and magnesium ions (hardness) and carbonate and bicarbonate ions (alkalinity) in raw water is objectionable for many purposes, and in many systems that utilize water. It, therefore, is considered desirable and often necessary, to subject raw water containing such ions to softening and/or dealkalizing treatment prior to its use.

Perhaps the most common and least tolerable chemical impurities in raw water are the hardness-producing ions, namely, calcium and magnesium. They are responsible for the tenacious scale which deposits and builds up in boilers, pipes, condenser jackets, circulating systems, cooking utensils, and other equipment contacted by hot water. The presence of calcium and magnesium salts also adversely affects the taste of many food products, particularly canned foods. It long has been known that hard water causes scaling in household appliances and that it produces a curd in the presence of common soaps before a lather can be created, thus soiling kitchen utensils. This curd also imparts a somewhat grayish appearance to laundry in addition to being wasteful in the use of soap.

Perhaps the greatest objection to alkalinity in raw water comes from the operators of steam boilers. Under the influence of heat, bicarbonate and carbonate ions decompose to yield carbon dioxide which thereupon reacts with water to form carbonic acid that in turn, reacts with and corrodes steel and other ferrous alloys. In addition, the corrosion product, ferrous bicarbonate, deposits in and eventually fouls water lines.

There are other objections to alkalinity in raw water. For example, a high bicarbonate content often causes ice (e.g. in ice cubes frozen from alkaline raw water) to be cloudy and brittle. Bottled beverages and other food products prepared with the use of alkaline raw water tend to have their acidic contents neutralized by alkaline water thereby to become flat and tasteless.

One of the standard methods of treating boiler makeup water is by the hot-lime precipitation process. In the treatment of water by hot-lime-soda, the most common hot precipitation method, lime and soda ash are added to the raw water supply. The lime reacts with the calcium bicarbonate and soluble magnesium salts present in the raw water, precipitating insoluble calcium carbonate and magnesium hydroxide. The function of the soda ash, which is generally added in excess of the stoichiometric amount, is to precipitate the soluble calcium salts as insoluble carbonates. This method, while reasonably effective, has always possessed certain disadvantages. Thus, large space is required for equipment, and elaborate chemical feed controls must be maintained to meter lime and soda ash to the system. Moreover, both lime and soda ash are relatively expensive.

A well known and very effective method for removing hardness and/or alkalinity from raw water supplies is the ion exchange process, which relies on the replacement of calcium and magnesium ions in raw water by an equivalent number of sodium ions. Hard raw water is passed through a column of a sodium form of a cation exchange resin in which the objectionable calcium and magnesium ions are replaced by non-objectionable sodium ions. When the capacity of the resin for adsorbing calcium and magnesium ions in such manner is exhausted, the column is regenerated with a salt (sodium chloride) solution.

In the case of alkaline raw water, i.e. water containing carbonate and bicarbonate ions, it may be desirable to remove such alkalinity. Again, this can be done by ion exchange. A known chloride-anion exchange process relies on replacing the alkalinity in the water with chloride ions, using a strongly basic anion exchange resin in the chloride form. When the capacity of the resin to function has been exhausted, regeneration of the resin to the chloride form is necessary. This is done by passing a solution of salt (sodium chloride) through the resin column.

A disadvantage with all such ion exchange procedures, as just described, is that the beds of ion exchange materials become exhausted after a period of use and, therefore, must be removed and regenerated at frequent intervals. The regeneration of the softening and dealkalizing ion exchange resin process is done by treatment with a substantial amount of regenerant brine solution, about 10 to 12 pounds of sodium chloride per cubic foot of resin. This treatment is inconvenient, time-consuming, and relatively expensive. Furthermore, such conventional ion exchange processes are neither very effective nor economical, when the raw water to be treated contains more than about 500 ppm of total dissolved solids.

SUMMARY OF THE INVENTION

1. Purposes of the Invention

It is a principal object of the present invention to provide an electrolytic softening-dealkalizing process for raw water which does not require the use of any external chemicals for its operation, e.g., for regeneration.

It is another object of the invention to provide an electrolytic system for softening and dealkalizing raw water simultaneously in both chambers of a two-chamber electrolytic cell It is another object of the invention to provide an electrolytic system for softening and dealkalizing raw water at low power consumption and high efficiency.

It is another object of the invention to provide an electrolytic process of the character described in which precipitation of insoluble material in the cathode chamber is kept under control and electrochemical corrosion of the anode is eliminated.

2. Brief Description of the Invention

According to the present invention, simultaneous softening and dealkalization of water is accomplished electrolytically in a cell by incorporating in such cell two chambers defined by two end electrodes and a cation exchange membrane interposed between them. Such a cell includes a device which may be automatic or manual to reverse the polarity applied thereto at intervals. The chambers are connected hydraulically in parallel with a common raw water input and may have a common combined output of softened dealkalized product water.

BRIEF DESCRIPTION OF THE DRAWINGS

In the accompanying drawings in which are shown various possible embodiments of the invention:

FIG. 5 is an exploded perspective view of the components of one typical module of a cell assembly for effecting the method of the present invention.

PREFERRED EMBODIMENTS OF THE INVENTION

Figure 1:
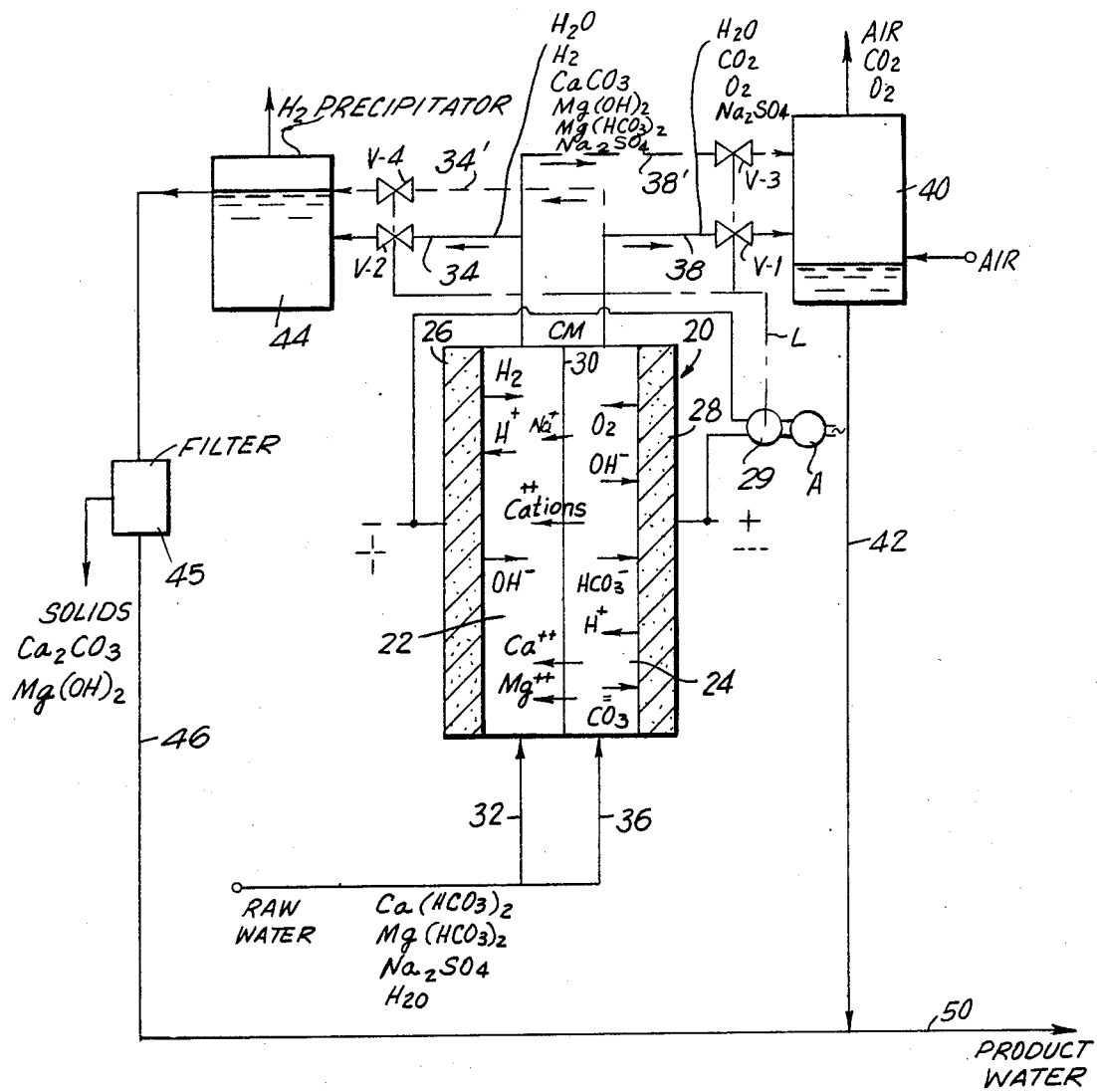
FIG. 1 is a schematic view of an apparatus for effecting a continuous process for softening and dealkalizing raw water.

In FIG. 1 there is illustrated a simple form of electrolytic cell 20 for carrying out the present invention. The cell 20 has two chambers 22, 24, the chamber 22 being a cathode or anode chamber depending on the polarity applied to the electrode and the chamber 24 being an anode or cathode chamber depending on the polarity of the electrode therein. Both chambers 22 and 24 are either softening or dealkalizing water chambers, depending upon the polarity of the applied energizing D.C. source to the electrodes therein. The reference letter A denotes a source of D.C. potential, e.g. a rectifier with a filtered D.C. output. The rectifier output is led to a polarity reversing device 29, which at a fixed user selected predetermined time interval will reverse the D.C. voltage applied to the electrodes 26, 28. Preferably, the device 29 operates automatically, i.e., switches the applied D.C. potential to the electrodes automatically at predetermined times; however, the device can be operated manually.

The cell has two electrically conductive electrodes 26, 28, one in each chamber, preferably graphite electrodes, to which a suitable D.C. potential is applied. The polarity of such potential is reversed at predetermined time intervals The common wall which separates the electrode chambers 22, 24 constitutes a cation exchange membrane 30, e.g. an MC-3142 or MC-3470 manufactured by Ionac, Chemical Division of Sybron Corporation.

Raw water is supplied through an inlet conduit 32 to the chamber 22 and liquid leaves said chamber through an outlet conduit 34, Similarly, raw water enters the chamber 24 through an inlet conduit 36 and exits from said chamber through an outlet conduit 38. Typically, the raw water is untreated water, such, for example, as surface water or ground water, or treated water such as tap water. Waters of this nature, typically will contain troublesome calcium and magnesium (hardness) ions and bicarbonate and carbonate (alkalinity) ions in solution which it is desired to remove.

In the cell 20 under consideration, let it be assumed, for the first half of a given cycle, that the electrode 26 is negative and the electrode 28 is positive. In that case (half cycle) the chamber 22 is the cathode chamber and the chamber 24 is the anode chamber of the cell. In the operation of the cell 20, during the first half of the cycle under consideration, raw water containing hardness and alkalinity contaminants that are to be removed, is led into both chambers 22 and 24. The undesired calcium and magnesium cations will pass from the anode chamber 24 through the cation exchange membrane 30 into the cathode chamber 22 under the influence of the applied D.C. voltage, and the undesired bicarbonate and carbonate anions in the anode chamber 24, will be converted at the chamber 24 into carbon dioxide gas. Hence, the fluid leaving the anode chamber 24 is now soft-dealkalized water, carbon dioxide and oxygen gas.

The carbon dioxide and oxygen produced in the anode chamber is removed by degassing in a degasifier 40 and the product water is withdrawn from the degasifier through conduit 42.

The following reactions take place in the anode chamber:

$$H_2O \rightarrow H^+ + OH^- \qquad A(a)$$

$$HCO_3^- + H^+ \rightarrow CO_2 \uparrow + H_2O \qquad A(b)$$

$$4OH^- \rightarrow 2H_2O + O_2 \uparrow \qquad A(c)$$

$$CO_3^= + 2H^+ \rightarrow CO_2 + H_2O \qquad A(d)$$

In the other electrode chamber, to wit, the cathode chamber 22, during the first half of the cycle under consideration, a different action is taking place as follows:

The following reactions take place in the cathode chamber:

$$Ca^{++} + 2OH^- \rightarrow Ca(OH)_2 \qquad C(a)$$

$$Mg^{++} + 2OH^- \rightarrow Mg(OH)_2 \downarrow \qquad C(b)$$

$$H_2O \rightarrow H^+ + OH^- \qquad C(c)$$

$$2H^+ \rightarrow H_2 \uparrow \qquad C(d)$$

$$Ca(HCO_3)_2 + Ca(OH)_2 \rightarrow 2CaCO_3 \downarrow + 2H_2O \qquad C(e)$$

The electrolyte in the cathode chamber 22 will be subject to electrolyzation, discharging hydroxy ions into the catholyte and hydrogen ions towards the cathode plate 26 where the latter form hydrogen gas. The hydroxy ions will react with magnesium ions, forming precipitates of water-insoluble magnesium hydroxide. Calcium bicarbonate will react with calcium hydroxide to form water-insoluble calcium carbonate. Hence, the fluid leaving the cathode chamber 22 is now soft-dealkalized water which contains the suspended precipitates and hydrogen gas. The gas is separated from the water in a separator 44 and product water is withdrawn from said separator through a filter 45 and conduit 46.

The effluents from the conduits 42 and 46 may be combined to constitute a product stream 50 which is soft-dealkalized water that can be used where hard and alkaline water is objectionable.

Attention is directed to the fact that the polarity of the cell must be reversed at intervals to avoid fouling of the electrodes by insoluble material, such as $CaCO_3$ to an extent which would by precipitation at the surface of the cathode interfere with the operation of the system during the half cycle when any particular electrode has a negative polarity applied thereto.

Deposit of water-insoluble calcium carbonate and magnesium hydroxide on the cathode electrode takes place during the entire half cycle of the cell when a given electrode is cathodic. However, such precitation does not occur to a serious degree that suffices to interfere with cell operation for at least several minutes It has been observed that if electrode polarities are reversed at least a few times an hour (usually four times an hour for a typical raw hard water) the build up of water-insoluble salts on the then cathode does not deleteriously affect efficient operation of the cell and, moreover, whatever water-insoluble salts have been deposited on an electrode when cathodic have been observed to have dissipated, usually within less than a minute, upon reversal of polarity.

To accommodate for this reversal of polarity, valves V-1, V-2, V-3 and V-4 are provided at the exits of both chambers 22, 24. A synchronous operating connection for these valves is indicated connecting said valves to the reversing switch 29 by the dot-and-dash line L. These valves may be operated automatically in synchronism with the operation of the polarity reversal of the switching device 29 according to the polarity of the cell as follows:

|  | V-1 | V-2 | V-3 | V-4 |
|---|---|---|---|---|
| Left electrode 26 negative: − Right electrode 28 positive: + | Open | Open | Closed | Closed |
| Left electrode 26 positive: + Right electrode 28 negative: − | Closed | Closed | Open | Open |

The flows through the conduits 34, 38 with the valves V-2, V-1 open is illustrated in FIG. 1 by solid lines and the flows through the conduits 34', 38' with the valves V-4, V-3 open is illustrated in FIG. 1 by dotted lines.

By changing the polarity of the cell periodically, preferably at predetermined intervals, with the positions of the valves as indicated above, the surface precipitation at the electrode which is negative during any given half cycle, the cathode, is kept under control and the cell can run indefinitely.

The foregoing cell 20 can be repeated in multiple in which more than two chambers are employed, if greater output is desired. By "multiple" there is meant a battery of cells, e.g. plural cells, arranged physically in series, but connected hydraulically in parallel. All the cells have a common raw water input feeding to both of their two chambers and all of the cells have the outputs from both of their two chambers combined in a common output. The cells are connected electrically in parallel to a common source of D.C. power.

In order to assist in explaining the invention there now is set forth a theoretical analysis of a cell 20 functioning in accordance with the present invention during any half cycle of operations, i.e. when one of the electrodes is positive and the other is negative.

Let it be assumed that the raw water input includes these solutes in solution in water in the following amounts:

|  | mg/l |
|---|---|
| $Ca(HCO_3)_2$ | 50 |
| $Mg(HCO_3)_2$ | 30 |
| $Na_2SO_4$ | 20 |

For the purpose of this analysis other solutes can be disregarded and, usually, will be present, if at all, in such small amounts, as not to affect the operation of the invention or the following analysis.

Let it also be assumed that the flow rates through each of the anode and cathode chambers of a simple cell (or of a battery of cells) is the same and is:

| raw water input | 6 liters per hour |
|---|---|
| anode chamber output | 3 liters per hour |
| cathode chamber output | 3 liters per hour |

Formulae A(a), A(b) and A(c) denote the reactions taking place in the anode chamber.

Formulae C(a), C(b), C(c), C(d) and C(e) denote the reactions taking place in the cathode chamber.

The feed rates into each chamber are:

|  | mg/hr |
|---|---|
| $Ca(HCO_3)_2$ | $3 \times 50 = 150$ |
| $Mg(HCO_3)_2$ | $3 \times 30 = 90$ |
| $Na_2SO_4$ | $3 \times 20 = 60$ |
|  | 300 |

Breaking the feed rates down as to the cathode chamber for cation feed rates:

$$Ca^{++}(\text{through } CM^*) = \frac{[Ca^{++}]^{**}}{[Ca(HCO_3)_2]} \times 150 =$$

$$\frac{40}{162} \times 150 = 37.04 \text{ mg/hr}$$

$$Mg^{++}(\text{through } CM) = \frac{[Mg^{++}]}{[Mg(HCO_3)_2]} \times 90 =$$

$$\frac{24.3}{146.3} \times 90 = 14.95 \text{ mg/hr}$$

*$CM$ is cation exchange membrane
**[ ] denotes molecular weight or atomic weight The salts formed in the cathode chamber is at the following rates:
$Ca(OH)_2$ formed by reaction C(a)

$$\frac{[Ca(OH)_2]}{[Ca^{++}]} \times 37.04 = \frac{74}{40} \times 37.04 = 68.52 \text{ mg/l}$$

$Mg(OH)_2$ formed by reaction C(b)

$$\frac{[Mg(OH)_2]}{[Mg^{++}]} \times 14.95 = \frac{58.3}{24.3} \times 14.95 = 35.87 \text{ mg/hr}$$

of the water disassociated in the cathode chamber per reaction C(c), the $OH^-$ ions reacted are:

$$C(a) \frac{[2 \text{ OH}^-]}{[Ca^{++}]} \times 37.04 = \frac{34}{40} \times 37.04 = 31.48 \text{ mg/l}$$

$$C(b) \frac{[2 \text{ OH}^-]}{[Mg^{++}]} \times 14.95 = \frac{34}{24.3} \times 14.95 = 20.92 \text{ mg/l}$$

Total $OH^-$ ions $\overline{52.40}$ mg/l

The hydrogen available in the cathode chamber is: from reaction C(c)

$$H^+ = \frac{[H^+]}{[H_2O]} \times 52.4 = 3.08 \text{ mg/l}$$

from reaction C(d)

$$H_2 = [H^+] \times 3.08 = 3.08 \text{ mg/l}$$

The water disassociated in the cathode chamber as per reaction C(c) is:

$$\frac{[H_2O]}{[OH^-]} \times 52.4 = \frac{18}{17} \times 52.4 = 55.48 \text{ mg/l}$$

The $CaCO_3$ formed in the cathode chamber pursuant to reaction C(e) is:

$$\frac{2[CaCO_3]}{[Ca(OH_2)]} \times 68.52 = \frac{200}{74} \times 68.52 = 185.19 \text{ mg/l}$$

The water formed in the cathode chamber pursuant to reaction C(e) is:

$$\frac{2[H_2O]}{[Ca(OH_2)]} \times 68.52 = \frac{36}{74} \times 68.52 = 33.33 \text{ mg/l}$$

The net water fed into the cathode chamber is:

$$55.48 - 33.33 = 22.15 \text{ mg/l}$$

Based on the foregoing the material balance for the cathode chamber is:

| input | mg/hr | output | mg/hr |
| --- | --- | --- | --- |
| $Ca(HCO_3)_2$ | 150.00 | $H_2$(gas) | 3.08 |
| $Mg(HCO_3)_2$ | 90.00 | $CaCO_3 \downarrow$ | 185.19 |
| $Na_2SO_4$ | 60.00 | $Mg(OH)_2 \downarrow$ | 35.87 |
| $Ca^{++}$(from anode chamber) | 37.04 | $Mg(HCO_3)_2$ | 90.00 |
| $Mg^{++}$(from anode chamber) | 14.95 | $Na_2SO_4$ | 60.00 |
| Water | 22.15 | Total | 374.14 |
| Total | 374.14 | | |

Now considering the anode chamber, the input (as it is to the cathode chamber) is:

| | mg/hr |
| --- | --- |
| $Ca(HCO_3)_2$ | 150 |
| $Mg(HCO_3)_2$ | 90 |
| $Na_2SO_4$ | 60 |
| Total | 300 |

The bicarbonate ions formed by disassociation of $Ca(HCO_3)_2$ are:

$$\frac{[(HCO_3)_2]}{[Ca(HCO_3)_2]} \times 150 = \frac{122}{162} \times 150 = 112.96 \text{ mg/hr}$$

The bicarbonate ions formed by disassociation of $Mg(HCO_3)_2$ are:

$$\frac{[(HCO_3)_2]}{[Mg(HCO_3)_2]} \times 90 = \frac{122}{146.3} \times 90 = 75.05 \text{ mg/hr}$$

Total $HCO_3$ ions $\overline{188.01}$ mg/hr $H^+$ ions formed are:

$$\frac{[H]}{[HCO_3]} \times 188.01 = \frac{1}{61} \times 188.01 = 3.08 \text{ mg/hr}$$

$OH^-$ ions formed are:

$$\frac{[OH]}{[H]} \times 3.08 = \frac{17}{1} \times 3.08 = 52.40 \text{ mg/hr}$$

$CO_2$ gas formed is:

$$\frac{[CO_2]}{[HCO_3]} \times 188.01 = \frac{44}{61} \times 188.01 = 135.61 \text{ mg/l}$$

$H_2O$ formed is:

$$\frac{[\frac{1}{2}H_2O]}{[OH]} \times 58.40 = \frac{9}{17} \times 58.40 = 27.74 \text{ mg/l}$$

$O_2$ gas formed is:

$$\frac{[\frac{1}{4}O_2]}{[OH]} \times 52.40 = \frac{8}{17} \times 52.40 = 24.66 \text{ mg/hr}$$

Based on the foregoing the material balance for the anode chamber is:

| input | mg/hr | output | mg/hr |
| --- | --- | --- | --- |
| $Ca(HCO_3)_2$ | 150 | $O_2$ | 24.66 |
| $Mg(HCO_3)_2$ | 90 | $CO_2$ | 135.61 |
| $Na_2SO_4$ | 60 | $Na_2SO_4$ | 60.00 |
| Total | 300 | $H_2O$ | 27.74 |
| | | $Ca^{++}$ | 37.04 |
| | | $Mg^{++}$ | 14.95 |
| | | Total | 300.00 |

Thus the overall material balance for the cell is:

| input | mg/hr | output | mg/hr |
| --- | --- | --- | --- |
| $Ca(HCO_3)_2$ | 300 | $H_2 \uparrow$ | 3.08 |
| $Mg(HCO_3)_2$ | 180 | $O_2 \uparrow$ | 24.66 |
| $Na_2SO_4$ | 120 | $CO_2 \uparrow$ | 135.61 |
| Total | 600 | $CaCO_3 \downarrow$ | 185.19 |
| | | $Mg(OH)_2 \downarrow$ | 35.87 |
| | | $Mg(HCO_3)_2$ | 90.00 |
| | | $Na_2SO_4$ | 120.00 |
| $H_2O$ formed less $H_2O$ feed = | 27.74 − 22.14 = | | 5.59 |
| | | Total | 600.00 |

It will be appreciated that the outputs from the cathodic and anodic chambers may be combined (after the insoluble calcium and magnesium salts have been removed from the cathodic output) for many applications inasmuch as the presence of magnesium bicarbonate is acceptable. Of course, if it is not acceptable the cathodic output may be sent to waste or treated, as with lime, to form water-insoluble magnesium hydroxide.

Figure 2:
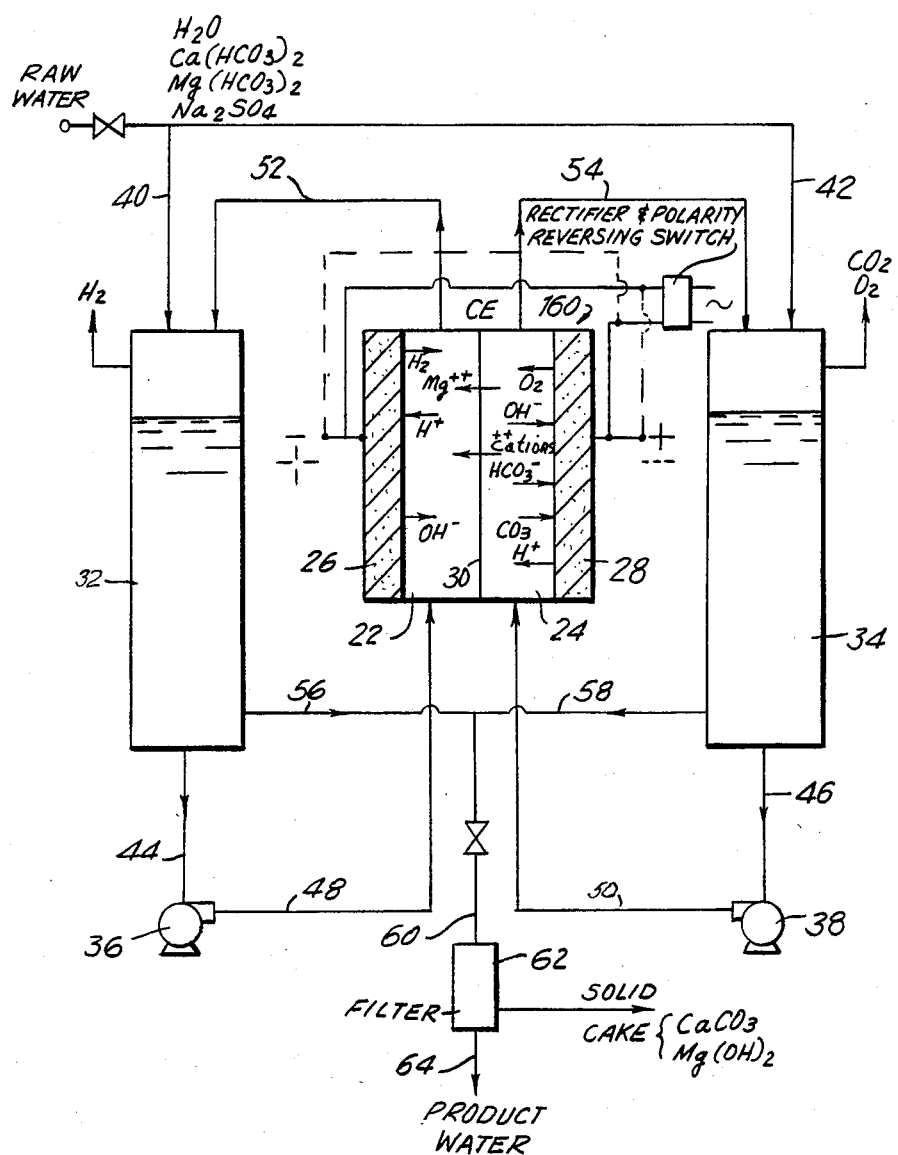
FIG. 2 is a schematic view of an apparatus for effecting a batch process for softening and dealkalizing raw water.

In FIG. 2 there is illustrated another form of cell 100 of the present invention.

The cell 100 of FIG. 2 is composed of the same elements as those employed in the cell 20 of FIG. 1, and the electrolytic actions are the same. However, the hydraulic circuit used is somewhat different. No special settling tank and degasifier is used, but instead two identical storage tanks 32 and 34 are employed. The hydraulic circuit to supply raw water to the system includes conduits 40, 42 which lead from the raw water supply to tanks 32, 34. Closed circulation systems are provided for both tanks through the two electrode compartments 22, 24 (cathode and anode, interchangeably)

of the cell. A conduit 44 leads from the bottom of the tank 32 to a pump 36 which discharges the solution under a mild pressure to a conduit 48 that leads to the chamber 22, and a conduit 52 leading from the chamber 22 discharges into the tank 32. Likewise, a conduit 46 leads from the bottom of the tank 34 to a pump 38 which discharges the solution under a mild pressure to a conduit 50 that leads to the chamber 24 and a conduit 54 leading from the chamber 24 discharges into the tank 34. In the operation of the cell 100 soft-dealkalized water during the half cycle shown in solid lines, insoluble precipitate ($CaCO_3$, $MgOH_2$) and hydrogen gas are produced in the tank 32, and soft dealkalized water, and oxygen gas and carbon dioxide gas are produced in the tank 34. After the batch is ready, product water is withdrawn from both tanks via conduits 56, 58, 60 and 64. A filter 62 is provided in the effluent line 60 to remove insoluble precipitate produced by the process.

For the next run in the following half cycle, the polarity of the cell is reversed manually to avoid fouling of the cathode. Now, insoluble material and hydrogen gas will be produced at tank 34 and carbon dioxide gas will be produced at tank 32.

By reversing the polarity of the cell after each half cycle the surface precipitation at the then cathode electrode is maintained under control and the system can run indefinitely.

In order further to illustrate the invention, typical cell parameters will be given for the operation of the cells depicted in FIGS. 1 and 2.

Both electrodes are graphite plates $\frac{1}{2}$" thick and of rectangular configuration, being $5\frac{3}{8}$" high and $4\frac{1}{2}$" wide; the cation exchange membrane is AMFion C-100; the effective transfer area of the membrane and electrodes is 18 sq. in.; the thickness of each chamber is 1/16".

Feed water hardness: 340 ppm as $CaCO_3$, Product hardness: 100 ppm
Feed water alkalinity: 346 ppm as $CaCO_3$, Product alkalinity: 108 ppm
Volume: 1 liter in each tank (for FIG. 2)
Processing time: 15 minutes per half cycle.
Current: 0.34 amp.
Voltage: 5.5 volts Cell Performance Hardness removed: 71%
Alkalinity removed: 68%
Cell productivity: 120 gallons per day/sq. ft. of electrode area
Power consumption: 2 KWH/1000 gal.

Figure 3:
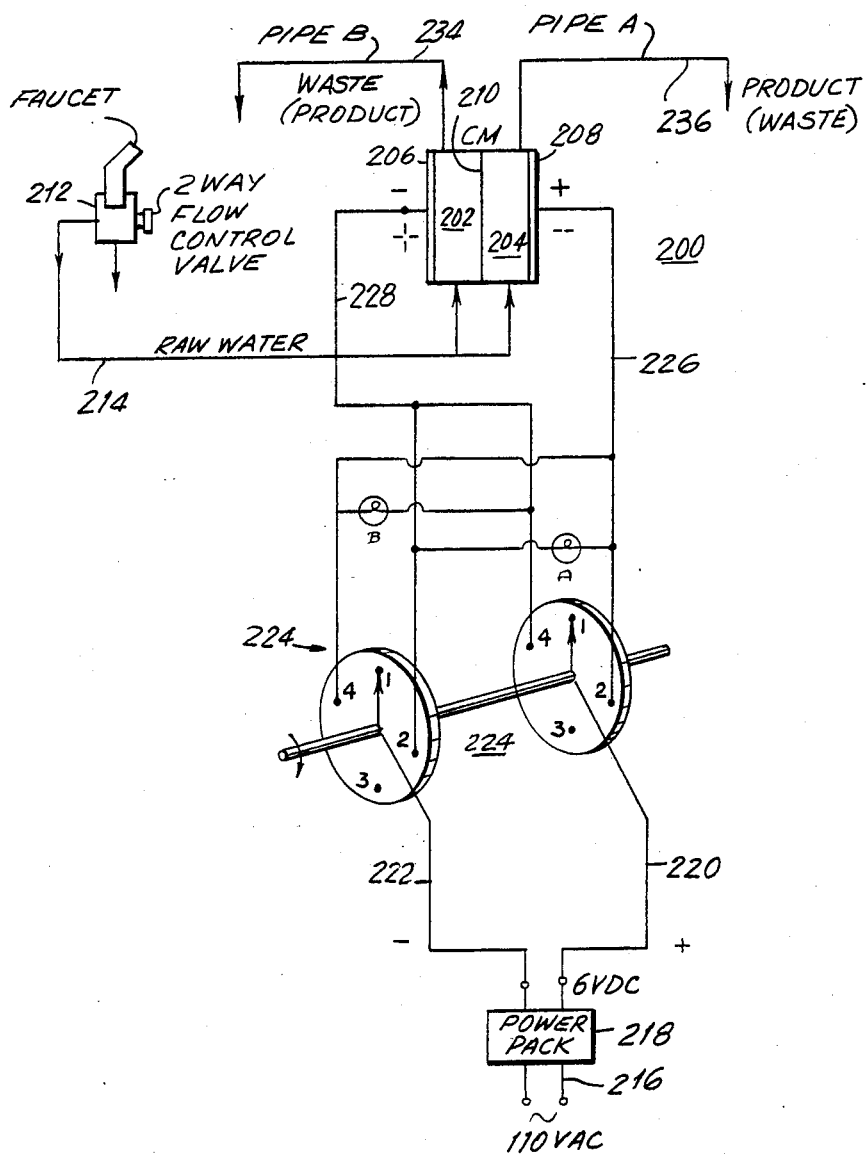
FIG. 3 is a schematic view of a manually reversible domestic unit for softening and dealkalizing raw water, together with an appended table of operations.

In FIG. 3, there is illustrated a cell 200 embodying a third form of the present invention which is uniquely adapted for use as a domestic water softener-dealkalizer unit (home water purifier).

The cell 200 is comprised of the same elements essentially as those employed in the cells 20 and 100. However, their arrangement does not include automatic valves; rather, the cell 200 is operated manually. Also, its hydraulic circuit has been simplified in comparison to those of the two previously described cells.

The cell 200 is intended to be operated continuously, but, unlike the cells 20 and 100 of FIGS. 1 and 2, it does not include a degasifier, a precipitator, or a filter. However, the electrochemical actions are essentially the same.

The effluent from the anode chamber is the soft dealkalized product water, while the effluent from the cathode chamber is led to waste.

The cell 200 is composed of an electrode chamber 202 and an electrode chamber 204, each of which has its own associated electrode 206, 208, respectively. The two chambers are separated by a cation exchange membrane (CM) 210.

Raw water, e.g. water supplied from a city main is fed to the cell 200 as through a push-button two-way flow control valve 212 through an inlet conduit 214, for example, a rubber pipe, to both chambers 202, 204 in parallel.

The chambers 202, 204 are alternately rendered anodic or cathodic, as in the case with the chambers of the cells 20 and 100, by alternately applying at different approximate halves of a cycle, positive and negative potentials, one or the other, to the electrodes 206, 208. In other words, during one-half of a cycle, for example, the electrode 206 is rendered negative, and during the other half of the same cycle this electrode is rendered positive. During the first half of this cycle, the electrode 208 is rendered positive, and during the succeeding half the electrode 208 is rendered negative.

A suitable circuit is provided for the foregoing purpose. Said circuit includes a suitable source 216 of AC current which feeds a rectifier 218 having a positive output lead 220 and a negative output lead 222 at a potential, for example, of 6 v. DC. These leads are fed to the center point of a four-position rotary switch or the like 224 in which the four positions are schematically indicated by the Arabic numerals 1, 2, 3, 4 which are located 90° apart. In positions 1 and 3, no potential is applied to either electrode. In position 2, current is led through the switch from lead 220 to lead 226 that runs to electrode 208 and, at the same time, current flows from lead 222 to lead 228 that runs to electrode 206, so that in position 2 the electrode 208 is positive and the chamber 204 anodic, and the electrode 206 is negative and the chamber 202 is cathodic. When the rotary switch is in position 4, said switch connects lead 222 to lead 226 that runs to electrode 208, and lead 220 to lead 228 that runs to electrode 206, whereby in this position of the rotary switch, i.e. position 4, electrode 206 is positive, rendering the chamber 204 cathodic.

In order to provide a visual indication to the householder of any existing condition of the cell 200, two pilot lights A and B are provided. Pilot light A is energized in position 2 to indicate that the chamber 204 is anodic and the chamber 202 is cathodic. At this time, the pilot light B is not illuminated. When the rotary switch is in position 4, pilot light B is energized to indicate that the chamber 202 now is anodic and the chamber 204 is cathodic.

Outlet conduits 234, 236 extend respectively from the chambers 202, 204. In switch position 2, the then anodic chamber 208 will supply soft-dealkalized product water and, in position 4, it is the then anodic chamber 206 which supplies such product water. In each instance, the effluent from the then cathodic chamber is led to waste.

It will be apparent, from the preceding description of the cell 200, that soft dealkalized water is withdrawn from whichever chamber is then anodic, at the same time, water will flow to waste from the then cathodic chamber, e.g. to a sink. The waste water will contain calcium carbonate and magnesium hydroxide precipitates.

It is noted, in passing, that in a typical cell 200, the rectifier 218 has a power output of about 110 to about 120 milliamperes, this being for a small installation using only two chambers.

It may be mentioned that the arrangement just described is not intended to be used to provide large flows of water. If substantial amounts of water are needed, for example, to fill a large container, the rotary switch will be moved from position 2 to position 4 alternately, being left a few minutes, e.g. 8 to 10 minutes, at each position.

By way of example, there are set forth below, typical parameters for a simple cell 200 constituting a stack 242 composed (see FIG. 5) of a first non-conductive end plate 244, a first cork gasket 246, a first electrode 206, a first flow distributor 248, a cation exchange membrane 210, a second flow distributor 250, a second electrode 208, a second cork gasket 252 and a second nonconductive end plate 254, held together by a set of insulating bolts and nuts, the bolts extending through registered openings 256 in the sundry plate-like elements of which the stack 242 is composed. One electrode 206 is provided with an inlet opening 258, a product outlet opening 260 and a waste outlet opening 262 (assuming the electrode 206 to be a cathode—the reverse is true if the electrode 206 is anodic) and each flow distributor is provided with a serpentine through passageway 264 having inlets 266, 272 and outlets 268, 274 to facilitate distribution of water in the cell. The cation exchange membrane 210 has an opening 270 in registry with the inlet openings 258 of the electrode 206, 266 of the first flow distributor 248, and 272 of the second flow distributor 250. The outlet opening 274 of the second flow distributor 250 is in registry with an outlet opening 276 in the cation exchange membrane, an outlet opening 278 in the first flow distributor and the outlet opening 260 in the first electrode. All openings in the first electrode are accessible through openings in the first end plate 244.

Raw inlet water flows through this succession of openings as a passageway and is distributed in both compartments of the cell which, in this instance, constitutes the serpentine passageways of the two flow distributors located between the respective electrodes 206, 208 and the cation exchange membrane 210. When the electrode, e.g. the electrode 208, is anodic soft dealkalized product water will exit through the outlet end 274 of the serpentine passageway of the second flow distributor 250 to leave through the outlet opening 260 of the electrode 206 while water will flow to waste from the outlet end 268 of the serpentine passageway 264 of the first flow distributor 248 to leave through the outlet 268 of that flow distributor and exit through the outlet opening of the outlet 262 of the then cathodic electrode 206 to waste, e.g. to a sink. Obviously, reversal of the polarities applied to the two electrodes will reverse the electrolytic actions so that soft dealkalized water then will leave through the outlet opening 262 of the then anodic first electrode 206 and waste water will leave through the outlet opening 260 of the then anodic electrode 206.

Figure 4:
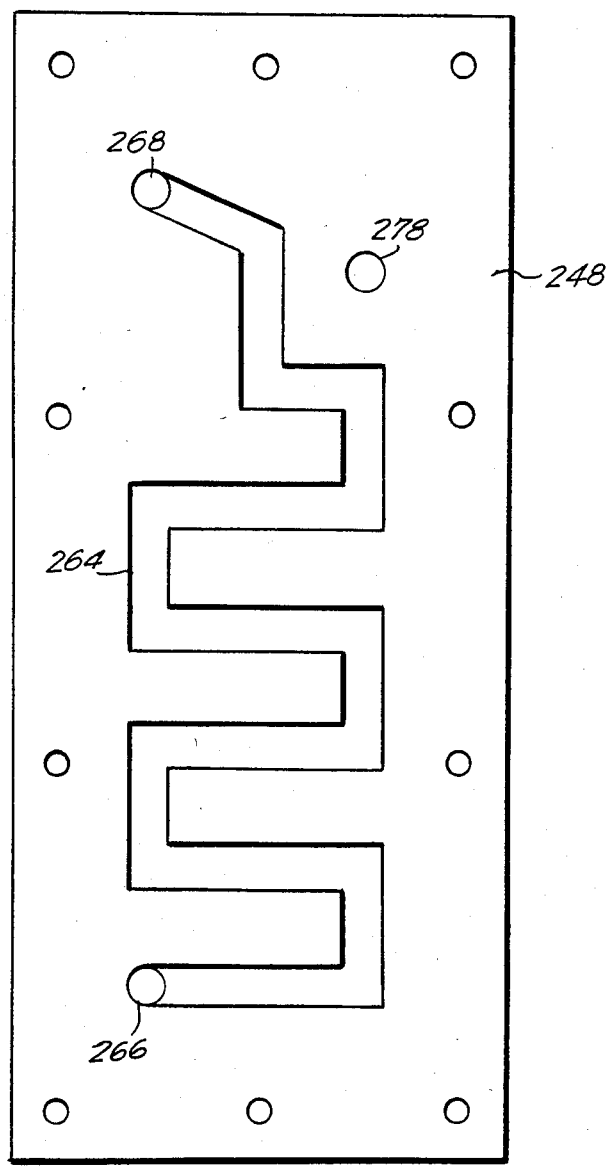
FIG. 4 is a face view of a flow distributor for a cell for carrying out the present invention.

A flow distributor for such a cell is shown in FIG. 4 to an enlarged scale, the dimensions indicated there being merely exemplificative.

Overall cell dimensions: Heights=5.75", Width=4"
Transfer area: 7 sq. in.
Flow Path: 28" (thickness 0.03125")
Cation exchange membrane: Selemion CMV manufactured by Asahi Glass Co. of Japan
Electrodes: Graphite plates 5.75"×4"×½"

Performance

Raw water hardness: 76 ppm as $CaCO_3$
Product water hardness: 28 ppm as $CaCO_3$
Hardness removed: 63.2%
Raw water alkalinity; 72 ppm as $CaCO_3$
Product water alkalinity: 15 ppm as $CaCO_3$
Alkalinity removed: 79.2%
Flow rate: 3.5 liters/hour purified water
Voltage: 6.0 volts DC
Current 120 MA DC
Current efficiency: (hardness removed)=85.1%
Current efficiency: (alkalinity removed)=89.1%
Flow velocity: 20 cm/sec.
Pressure drop: 5 psi The power required for such a two-chamber cell is approximately 0.7 watts per hour. The flow of raw water through such a cell is approximately 0.9 gallons per hour. The power required per thousand gallons is approximately 0.8 kilowatt hours which, at a cost of about $101\frac{1}{2}$ cents per kilowatt hour, is rather low for household usage, but is approximately correct for industry and brings the cost of softening and dealkalizing to slightly more than 1 cent per thousand gallons, a relatively slight amount. By way of comparison, softening hard water having a hardness of about $4\frac{1}{2}$ grains per gallon entails a cost of about 3 cents per thousand gallons, and dealkalizing water having an alkalinity of about 4 grains per gallon entails a cost of somewhat more than 4 cents per thousand gallons, totally somewhat more than 7 cents per thousand gallons, in comparison to the present invention's cost in a typical cell of less than 1 cent per thousand gallons for the same result, so that the net cost of softening and dealkalizing water pursuant to the present invention is less than 1/7 the cost of softening and dealkalizing water by current methods.

It will be understood that each of the elements described above, or two or more together, also may find a useful application in other types of constructions differing from the types described' above.

While the invention has been illustrated and described as embodied in a reversible electrolytic system for softening and dealkalizing water, it is not intended to be limited to the details shown, since various mdofications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims;

1. An electrolytic apparatus for softening and dealkalizing raw water containing hardness producing ions such as calcium and magnesium ions in the form of soluble salts thereof and alkaline producing ions such as carbonate and bi-carbonate ions in the form of soluble salts thereof, said apparatus comprising:
(A) at least two serially arranged compartments including:

(I) a first compartment;

(II) a non-corrodable graphite electrode disposed in said first compartment;

(III) a second compartment immediately adjacent said first compartment;

(IV) a non-corrodable graphite electrode disposed in said second compartment;

(B) a cation exchange memberane separating said first from said second compartment;

(C) means for introducing raw water in hydraulic parallel into both said compartments;

(D) means for supplying direct electric current;

(E) means for applying said direct electric current to said electrodes with a specific polarity DC voltage applied to either one of said electrodes and the opposite DC polarity applied to the other said electrode;

(F) means to reverse the DC polarities applied to said electrodes at intervals of several minutes so tht during one period of time one electrode and its compartment is cathodic and the other electrode and its compartment is anodic and during the next succeeding period of time the formerly cathodic electrode and its compartment become anodic and the formerly anodic electrode and its compartment become cathodic;

(G) the undesired calcium and magnesium ions in a then anodic compartment passing through the cation exchange member into a then cathodic compartment under the influence of the appled DC voltage;

(H) the undesired carbonate and bicarbonate ions converting into carbon dioxide gas at a then anodic electrode;

(I) means to draw soft-dealkalized water from a then anodic compartment;

(J) means to deposit some water insoluble calcium carbonate and magnesium hydroxide on a then cathodic electrode which dissipate when said electrode becomes anodic upon reversal of polarities; and (K) a first flow distributor between one side of the cation exchange member and the electiode in said first compartment, and a second flow distributor between another side of the cation exchange member and the electrode in said second compartment, each flow distributor having a serpentine passageway to facilitate water flow in the compartments.

2. An apparatus as set forth in claim 1, wherein carbonate and magnesium hydroxide deposit in the water of a then cathodic compartment and means is provided to draw water from the then cathodic compartment and to remove said calcium carbonate and magnesium hydroxide deposits therefrom.

3. An apparatus as set forth in claim 2, wherein means is provided to remove carbon dioxide gas from the soft-dealkalized water.

4. An apparatus as set forth in claim 3, wherein means is provided to lead the water from the then cathodic compartment to waste.

5. An apparatus as set forth in claim 2, wherein a manually operable valve is provided to supply raw water from a domestic tap and wherein the means to reverse the DC polarities is manually operable.

6. An apparatus as set forth in claim 2, wherein means is provided to constantly combine the outflow from both compartments.

7. An apparatus as set forth in claim 6, wherein the means to reverse the DC polarities operates automatically at predetermined intervals.

* * * * *